(12) United States Patent
Burton

(10) Patent No.: US 9,574,602 B2
(45) Date of Patent: Feb. 21, 2017

(54) CLINCH FASTENER

(71) Applicant: Rifast Systems LLC, Lincolnwood, IL (US)

(72) Inventor: John E. Burton, Ludington, MI (US)

(73) Assignee: Rifast Systems LLC, Lincolnwood, IL (US)

( * ) Notice: Subject to any disclaimer, the term of this patent is extended or adjusted under 35 U.S.C. 154(b) by 191 days.

(21) Appl. No.: 14/633,372

(22) Filed: Feb. 27, 2015

(65) Prior Publication Data

US 2015/0167727 A1 Jun. 18, 2015

Related U.S. Application Data

(63) Continuation of application No. 13/669,568, filed on Nov. 6, 2012, now Pat. No. 8,979,455.

(60) Provisional application No. 61/628,777, filed on Nov. 7, 2011.

(51) Int. Cl.
| | |
|---|---|
| *F16B 37/04* | (2006.01) |
| *F16B 39/282* | (2006.01) |
| *F16B 33/00* | (2006.01) |
| *F16B 37/06* | (2006.01) |
| *B23P 19/06* | (2006.01) |

(52) U.S. Cl.
CPC ............ *F16B 39/282* (2013.01); *B23P 19/064* (2013.01); *F16B 33/002* (2013.01); *F16B 37/068* (2013.01)

(58) Field of Classification Search
CPC ....... F16B 33/002; F16B 37/04; F16B 37/068; F16B 39/282; B23P 19/064
USPC .......................................... 411/166–167, 180
See application file for complete search history.

(56) References Cited

U.S. PATENT DOCUMENTS

| | | | |
|---|---|---|---|
| 1,112,525 A | 10/1914 | Dabling | |
| 1,686,468 A | 10/1928 | Rosenberg | |
| 3,125,146 A * | 3/1964 | Rosan ................... | F16B 37/068 411/180 |
| 3,137,336 A | 6/1964 | Wing | |
| 3,221,791 A | 12/1965 | Rosan | |
| 3,242,962 A | 3/1966 | Dupree | |
| 3,367,685 A | 2/1968 | Church et al. | |
| 3,399,705 A | 9/1968 | Breed et al. | |
| 3,461,936 A | 8/1969 | Rosan et al. | |
| 3,535,678 A | 10/1970 | Gulistan | |
| 3,578,367 A | 5/1971 | Harvill | |
| 3,782,436 A | 1/1974 | Steiner | |
| 3,926,237 A | 12/1975 | Enders | |

(Continued)

FOREIGN PATENT DOCUMENTS

GB          370948          4/1932

OTHER PUBLICATIONS

International Search Report mailed Jan. 24, 2013 for PCT/US2012/063780.

(Continued)

*Primary Examiner* — Roberta Delisle
(74) *Attorney, Agent, or Firm* — Brian G. Gilpin; Godfrey & Kahn, S.C.

(57) ABSTRACT

A self-clinching fastener for insertion into ductile sheets of varying thicknesses has increased push-out and torque-out resistance. The self-clinching fastener includes a plurality of radial projections and spline teeth that embed into the ductile sheets, causing the material to cold flow into a recess, thereby permanently clinching the self-clinching fastener to the ductile sheet.

10 Claims, 14 Drawing Sheets

(56) References Cited

U.S. PATENT DOCUMENTS

| | | | |
|---|---|---|---|
| 3,967,669 | A | 7/1976 | Egner |
| 4,274,460 | A | 6/1981 | Egner |
| 4,432,681 | A | 2/1984 | Capuano |
| 4,543,023 | A | 9/1985 | Capuano |
| 4,577,402 | A * | 3/1986 | Swanstrom ......... H01L 23/4006 174/16.3 |
| 4,637,766 | A | 1/1987 | Milliser |
| 4,708,556 | A * | 11/1987 | Pamer .................. F16B 37/068 411/179 |
| 4,713,960 | A | 12/1987 | Gassaway |
| 4,779,326 | A | 10/1988 | Ichikawa |
| 4,797,022 | A | 1/1989 | Crigger |
| 4,826,411 | A | 5/1989 | Gaeth |
| 4,827,756 | A | 5/1989 | Crigger |
| 4,836,043 | A | 6/1989 | Morris et al. |
| 4,940,375 | A | 7/1990 | Marvell et al. |
| 5,513,933 | A | 5/1996 | Rom |
| 5,531,552 | A * | 7/1996 | Takahashi .............. B21K 1/702 29/432.2 |
| 5,613,815 | A | 3/1997 | Muller |
| 5,630,611 | A | 5/1997 | Goss et al. |
| 5,722,139 | A | 3/1998 | Ladouceur et al. |
| 5,743,691 | A | 4/1998 | Donovan |
| 6,012,215 | A | 1/2000 | Demoura |
| 6,125,524 | A | 10/2000 | Mueller |
| 6,174,117 | B1 | 1/2001 | Kawatani et al. |
| 6,190,102 | B1 | 2/2001 | Vignotto et al. |
| 6,220,804 | B1 * | 4/2001 | Pamer .................. F16B 37/068 29/432.2 |
| 6,318,940 | B1 | 11/2001 | Mitts |
| D479,121 | S | 9/2003 | Jurdens |
| 6,817,815 | B2 | 11/2004 | Ross |
| 7,287,944 | B2 | 10/2007 | Ladouceur |
| 7,293,947 | B2 | 11/2007 | Craven |
| 7,306,418 | B2 | 12/2007 | Kornblum |
| 7,374,381 | B2 | 5/2008 | Maloney |
| 7,465,135 | B2 | 12/2008 | Fritsch |
| 8,011,866 | B2 | 9/2011 | Harris |
| 8,292,562 | B2 | 10/2012 | Chiu |
| 8,366,364 | B2 | 2/2013 | Maloney |
| 8,696,278 | B2 | 4/2014 | Babej et al. |
| 2002/0172573 | A1 | 11/2002 | Pamer et al. |
| 2006/0137166 | A1 | 6/2006 | Babej et al. |
| 2006/0204348 | A1 | 9/2006 | Shuart |

OTHER PUBLICATIONS

Rifast Clinch Fastenter Brochure; Nov. 21, 2013.
Rayknurled and Hub Pin Studs, Part. No. ADK6019; Nov. 21, 2013.
Forma-Tech Knurled Stud Bolts; Nov. 21, 2013.

* cited by examiner

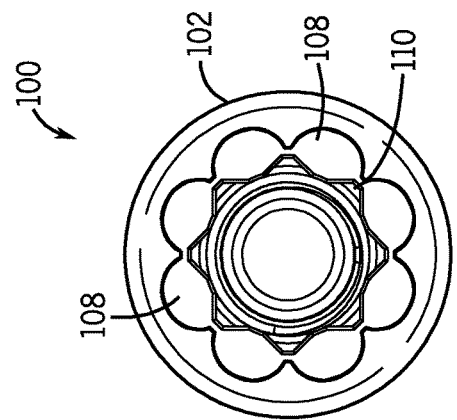
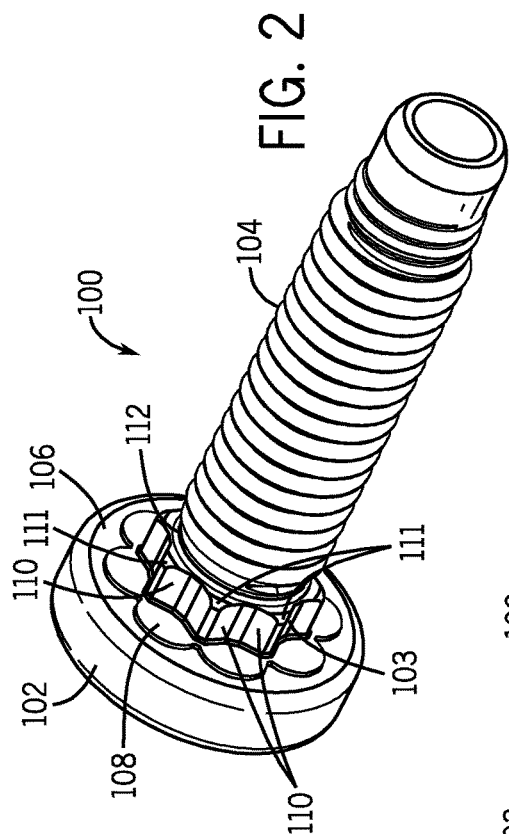
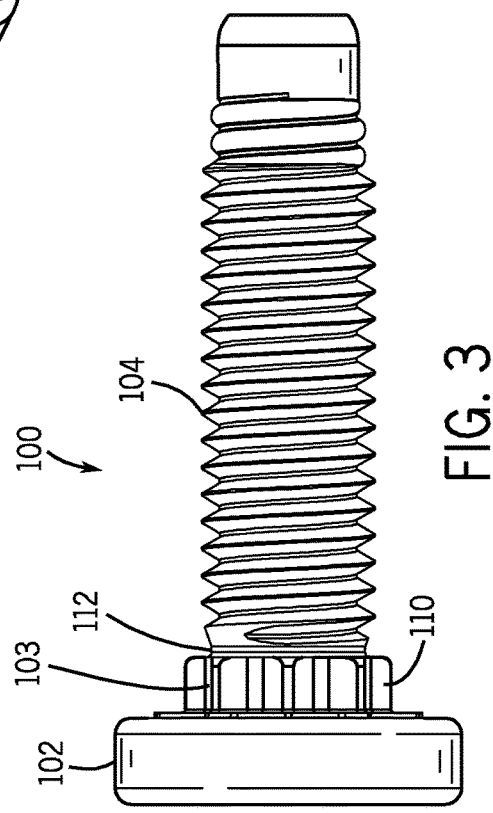

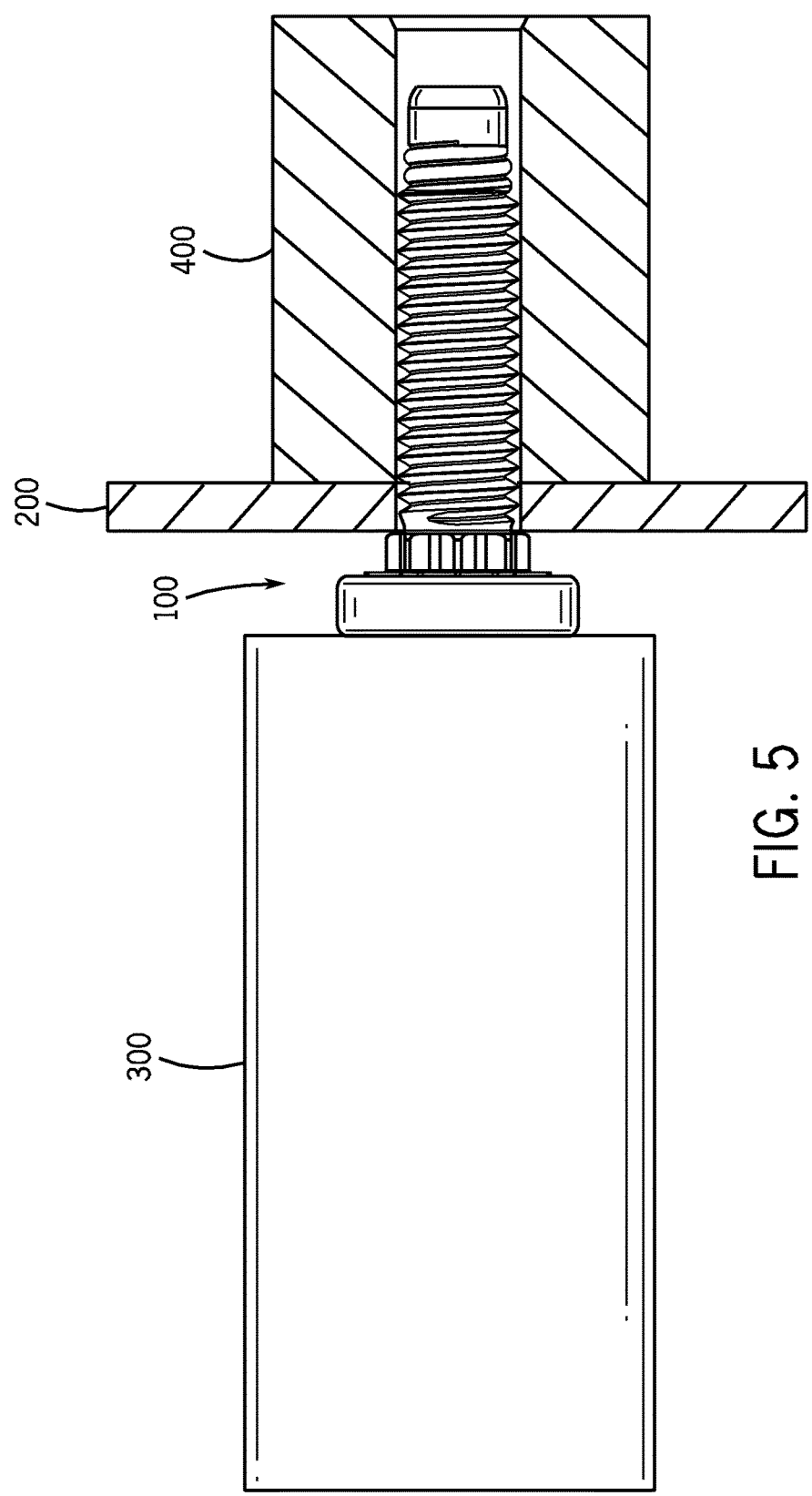

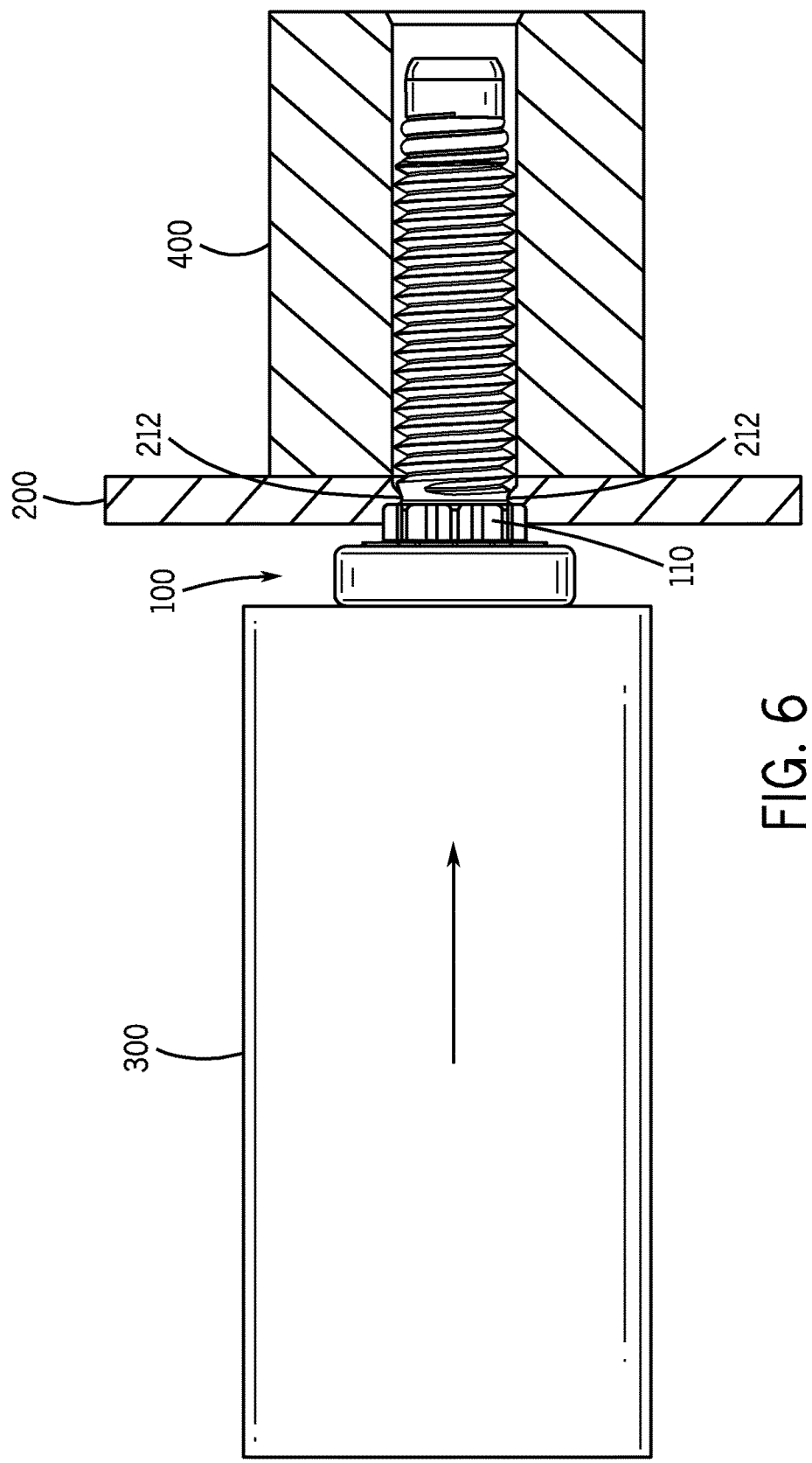

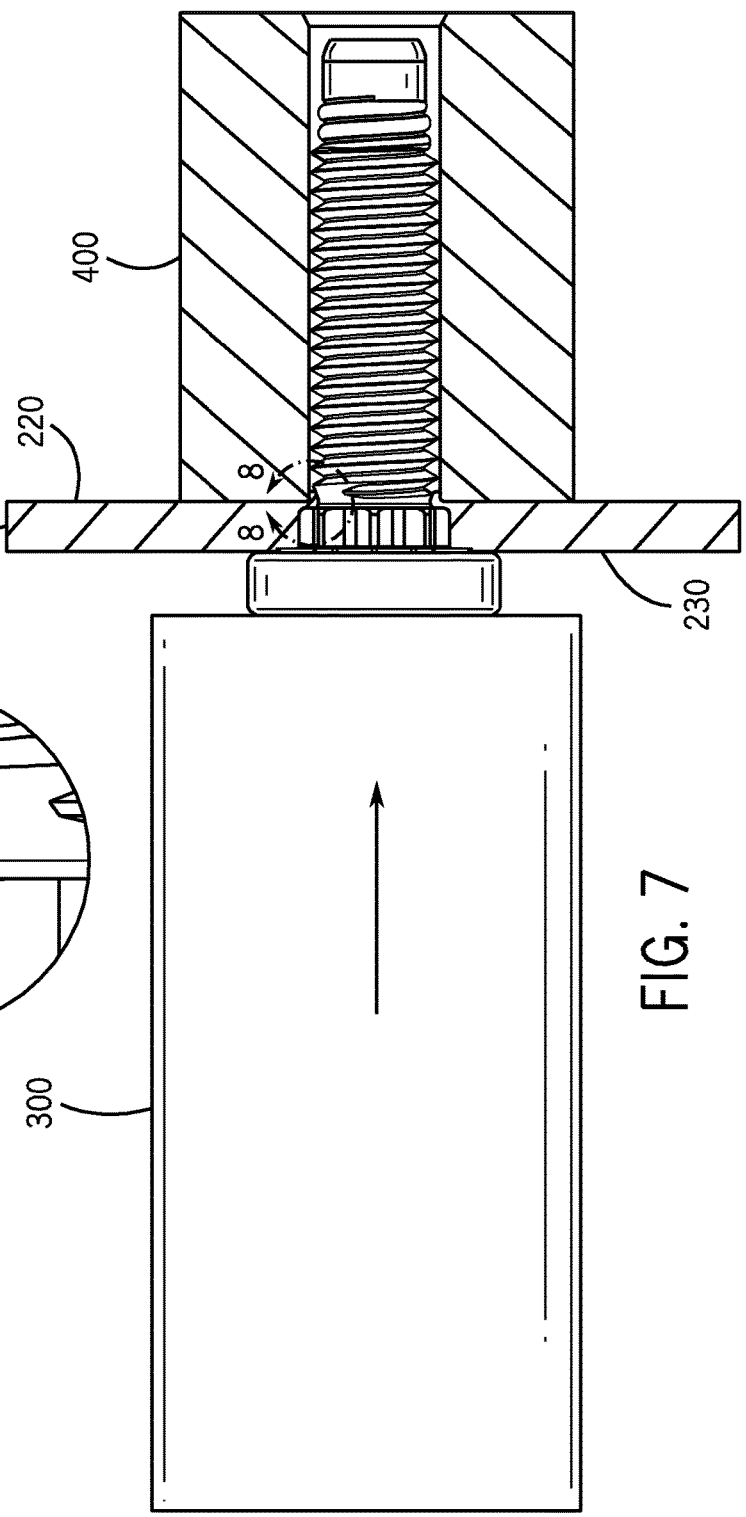
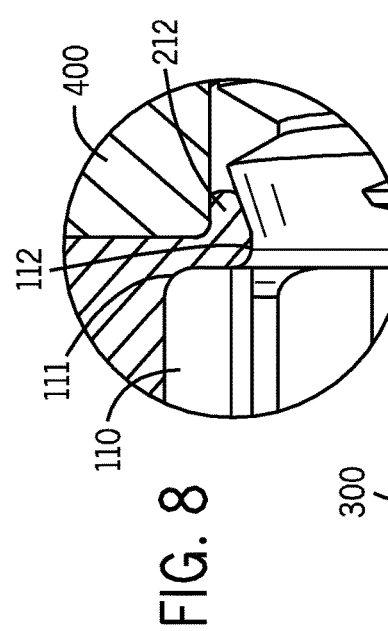
FIG. 7
FIG. 8

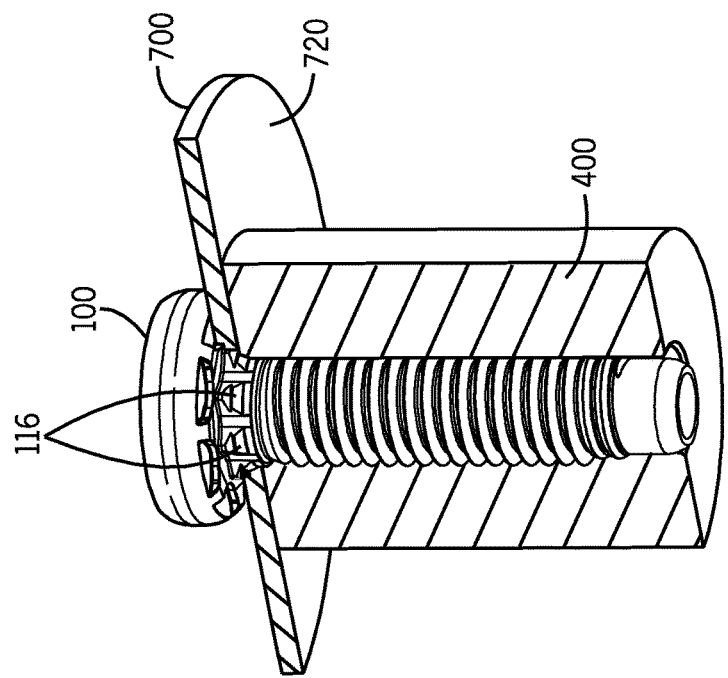
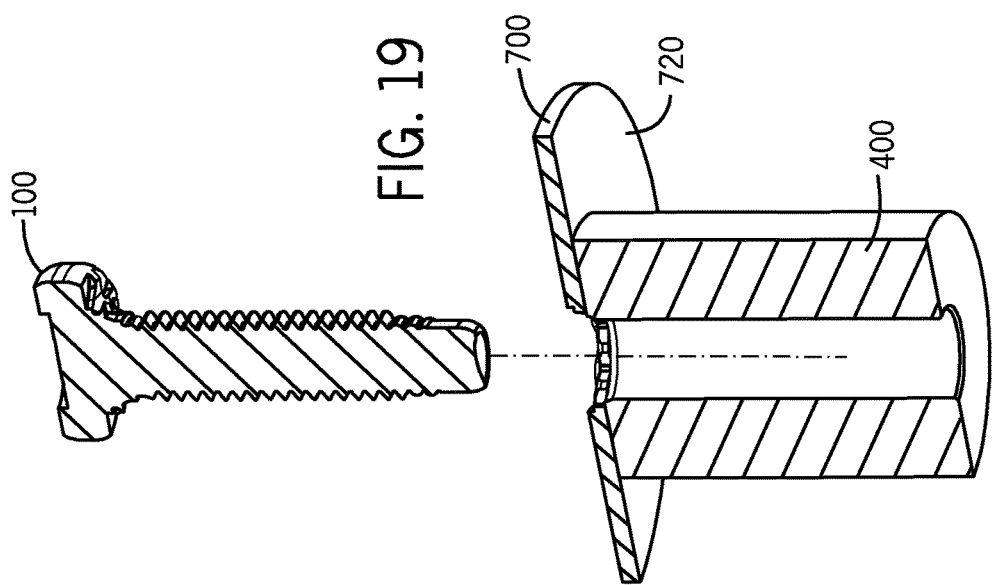

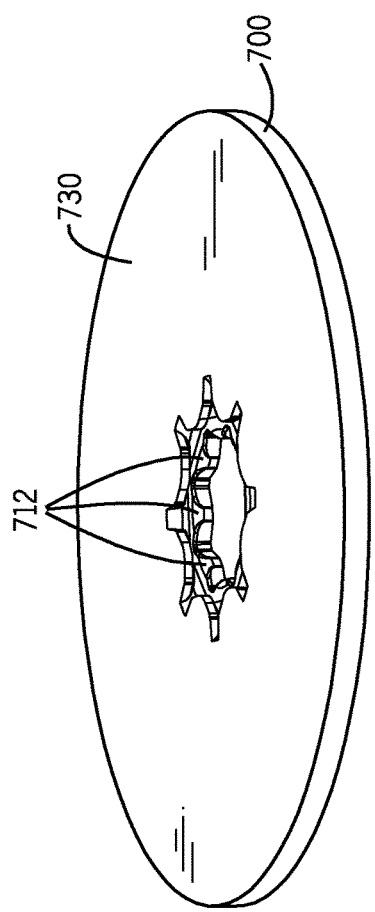
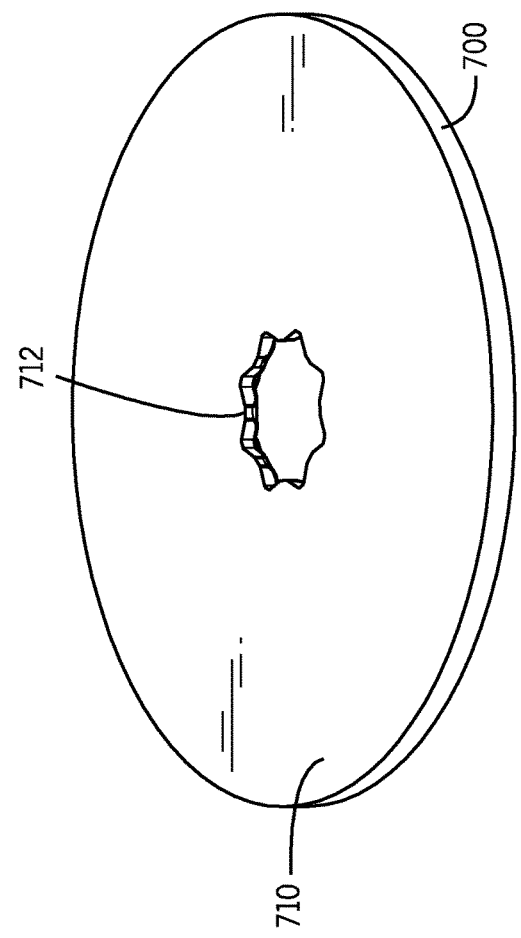

CLINCH FASTENER

CROSS-REFERENCE TO RELATED APPLICATION

This application is a continuation of application Ser. No. 13/669,568, filed on Nov. 6, 2012, now U.S. Pat. No. 8,979,455 issued on Mar. 3, 2015, which is based on and claims priority to U.S. Provisional Patent Application No. 61/628,777 filed on Nov. 7, 2011, both of which are incorporated herein by reference in their entirety for all purposes.

FIELD OF THE INVENTION

The present invention relates generally to the field of self-clinching fasteners. More particularly, the present invention relates to a self-clinching fastener for connection to a substrate or into an opening in a ductile material.

BACKGROUND

In the field of self-clinching fasteners, there is a need to design fasteners that have improved torque-out (rotational) and push-out resistance. Self-clinching fasteners are generally well-known in the art and have many different designs. Self-clinching fasteners attach to metal sheets, substrates, or openings in ductile material without welding or additional fasteners. When typical self-clinching fasteners are pressed into pre-punched, drilled, or reamed holes in ductile metal, the ductile metal cold flows into recesses and features of the self-clinching fastener to secure it to the metal. The recesses and features of existing self-clinching fasteners take a variety of forms, including knurls, ribs, and serrated clinching rings to name a few. Typical self-clinching fasteners utilize tooling in the die to locally compress the ductile metal into a recess on the fastener to secure it to the ductile metal. Once a self-clinching fastener is inserted into the ductile metal, the self-clinching fastener is permanently attached to the metal, and removal of the fastener results in either failure of the metal or the fastener.

Existing self-clinching fasteners suffer from a number of shortcomings such as limited torque-out resistance and limitations regarding the thickness of metal and shape of the hole into which the self-clinching fastener may be secured. Typical self-clinching fasteners require very tight tolerances in both the fastener itself and the hole into which the fastener is being installed. In particular, tight tolerances exist for both the size of the hole and the thickness of the sheet. The reason for tight hole size and sheet thickness tolerances is two-fold. First, existing self-clinching fasteners include features that prevent rotation of the fastener. Such features provide recesses or pockets into which the ductile metal cold flows during installation. Examples of the features are serrated rings, knurled studs, ribs, or a hexagonal shaped head that embeds into the surface of the metal. Second, there must be enough material immediately around the hole to cold flow into the various recesses and features of the self-clinching fastener to secure the fastener to the sheet and provide adequate push-out resistance. For example, if a self-clinching fastener is pressed into a hole that is slightly too large for the fastener, there may be insufficient material to flow into the recesses and features of the fastener thereby causing the connection between the fastener and the metal sheet to be weaker than anticipated and the fastener may fail during normal use.

Additionally, as sheet thickness increases, existing self-clinching fasteners sometimes require additional machining such as drilling and/or counter-boring of the ductile metal combined with special die tooling to adequately compress the ductile metal into the recesses of the self-clinching fastener to securely clinch the fastener. Such additional machining and special die tooling are often prohibitively expensive. Self-clinching fasteners for thick materials typically use knurled shoulder sections to resist torque-out. However knurls have shallow tooth depth, making them ill-suited for rough punched holes. The inner diameters of rough punched holes are tapered due to the punch process causing loss of engagement with the knurls. Subsequent hole reaming is often needed to prevent torque-out of such knurled-shoulder self-clinching fasteners.

Thus, there is a need for a self-clinching fastener that has high resistance to torque-out and push-out, can be attached to material of varying thickness, and can be attached to holes that do not have special geometry or pre-formed, or post-machined surfaces.

SUMMARY

The present invention relates to a self clinching fastener for connection to ductile material. One embodiment of the self-clinching fastener includes a head with an inner surface and an outer surface, the inner surface including a plurality of radial projections extending therefrom and positioned around the central axis of the self-clinching fastener. An anti-rotation protrusion is adjacent to and projecting from the inner surface of the head further includes a plurality of spline teeth extending radially from the central axis of the anti-rotation protrusion. The self-clinching fastener further includes a clinched material recess adjacent to the anti-rotation protrusion for accepting clinched material that is displaced by the plurality of spline teeth when the self-clinching fastener is pressed into the ductile material. It should be understood that similar design features could be used to design a staked nut, standoff, or other feature without departing from the invention.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 2 is another perspective view of the self-clinching fastener of FIG. 1.

FIG. 3 is a side view of the self-clinching fastener of FIG. 1.

FIG. 4 is a bottom view of the self-clinching fastener of FIG. 1.

FIG. 5 is a side view of the self-clinching fastener of FIG. 1, shown immediately before being clinched to a ductile sheet, the ductile sheet and die shown in cross-section.

FIG. 6 is a side view of the self-clinching fastener of FIG. 1, shown as it is being clinched to a ductile sheet, the ductile sheet and die shown in cross-section.

FIG. 7 is a side view of the self-clinching fastener of FIG. 1, shown clinched to a ductile sheet, the ductile sheet and die shown in cross-section.

FIG. 8 is a detail view of the self-clinching fastener of FIG. 7 taken generally along the line 8-8 in FIG. 7, with the ductile sheet and die shown in cross-section.

FIG. 19 is a section view of the self-clinching fastener, ductile sheet, and die of FIG. 1.

FIG. 20 is a perspective view of the self-clinching fastener, ductile sheet, and die of FIG. 1 shown with the self-clinching fastener clinched to the ductile sheet, the ductile sheet and die shown in cross-section.

FIG. 22-23 are perspective views of a thin ductile sheet showing the effect of the self-clinching fastener of FIG. 1 on the sheet as it is inserted into the sheet.

DETAILED DESCRIPTION

Figure 1:
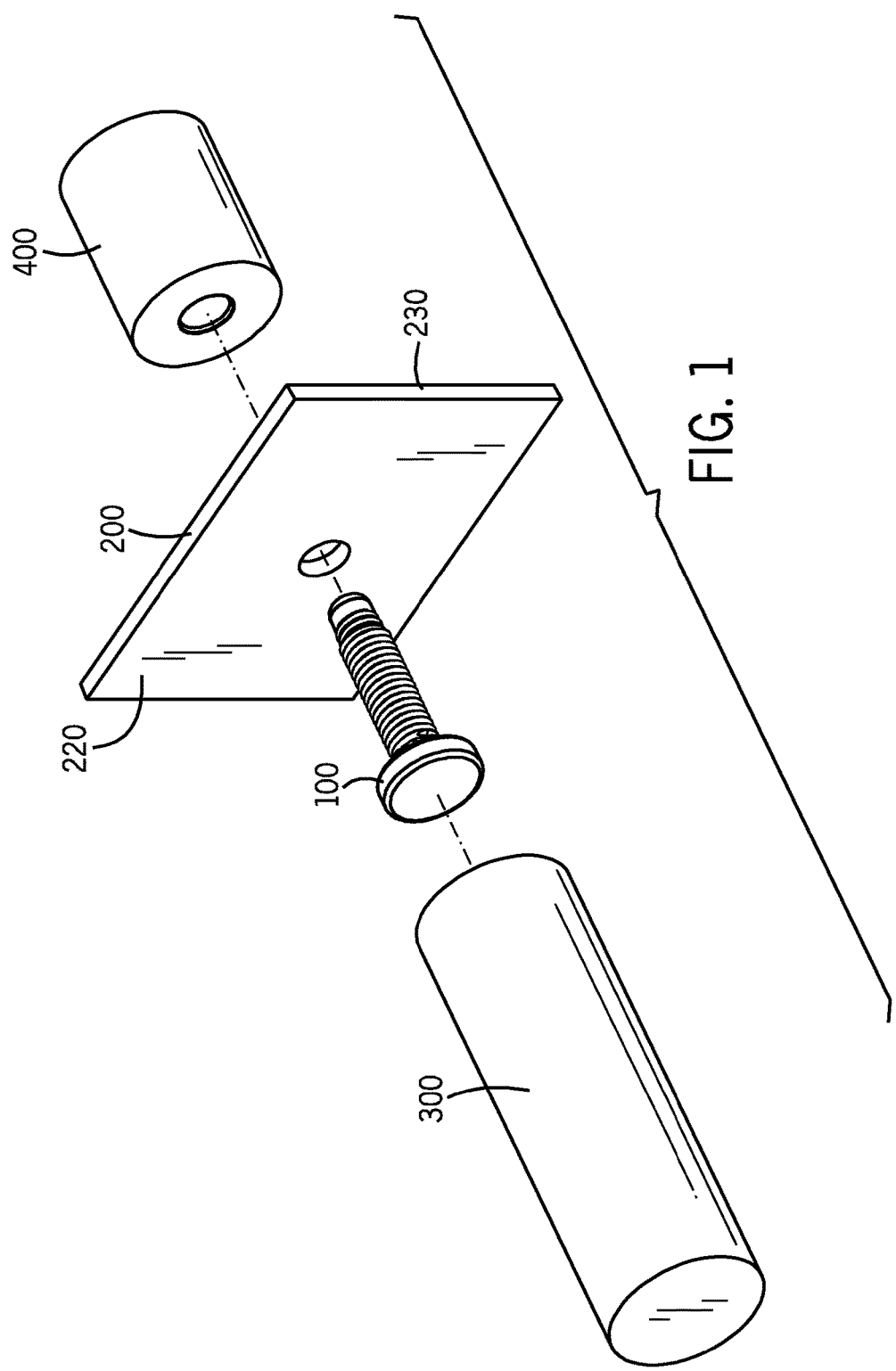
FIG. 1 is a perspective view of one embodiment of a self-clinching fastener in accordance with the invention, shown with the punch and die used to attach the fastener to a ductile sheet.
Figure 11:
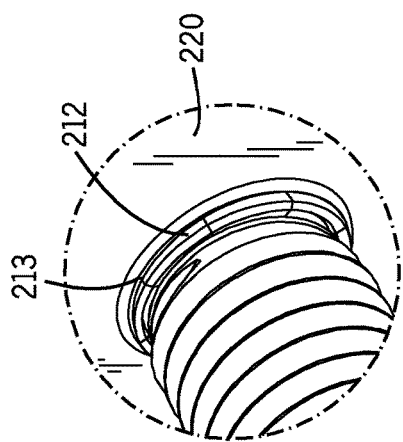
FIG. 11 is a detail view of the self-clinching fastener of FIG. 9 taken generally along the line 11-11 in FIG. 9.
Figure 12:
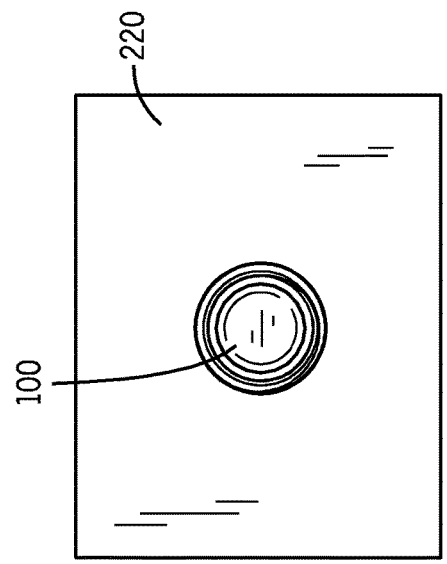
FIG. 12 is a top view of the self-clinching fastener of FIG. 1 with the fastener clinched to the ductile sheet.
Figure 9:
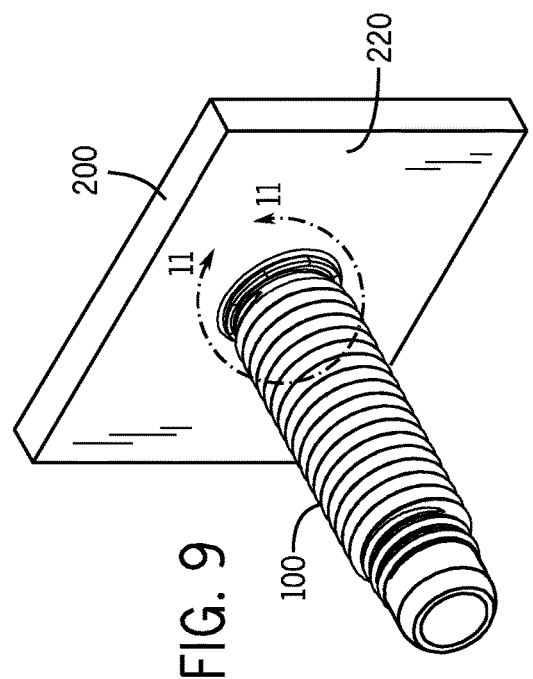
FIG. 9 is a bottom perspective view of the self-clinching fastener of FIG. 1 with the self-clinching fastener clinched to the ductile sheet.
Figure 10:
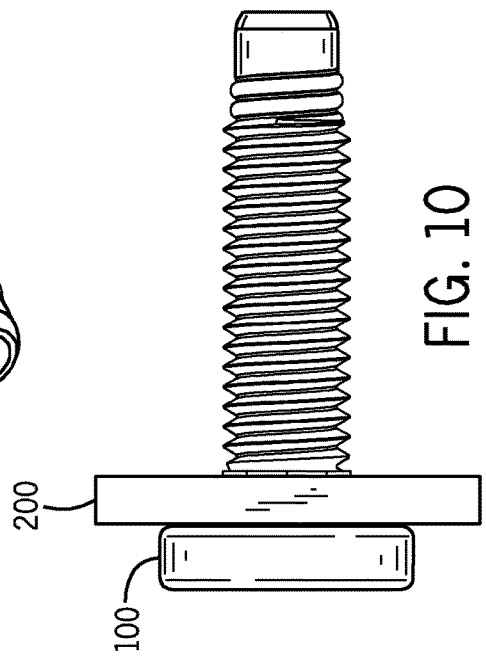
FIG. 10 is a side view of the self-clinching fastener of FIG. 1 with the self-clinching fastener clinched to the ductile sheet.

Referring to FIG. 1, one embodiment of a self-clinching fastener 100 in accordance with the invention is shown. In the embodiment shown, the self clinching fastener 100 is permanently attached to a nominal metal sheet 200 by inserting the self clinching fastener through a hole 210 and pressing it into place using a punch 300 and die 400 to press the self-clinching fastener onto the metal sheet. The nominal metal sheet has a punch side 220 and a die side 230. Although the embodiment shown shows the self-clinching fastener 100 clinched to a nominal metal sheet 200, the self-clinching fastener may be clinched to any ductile material without departing from the invention.

Figure 13:
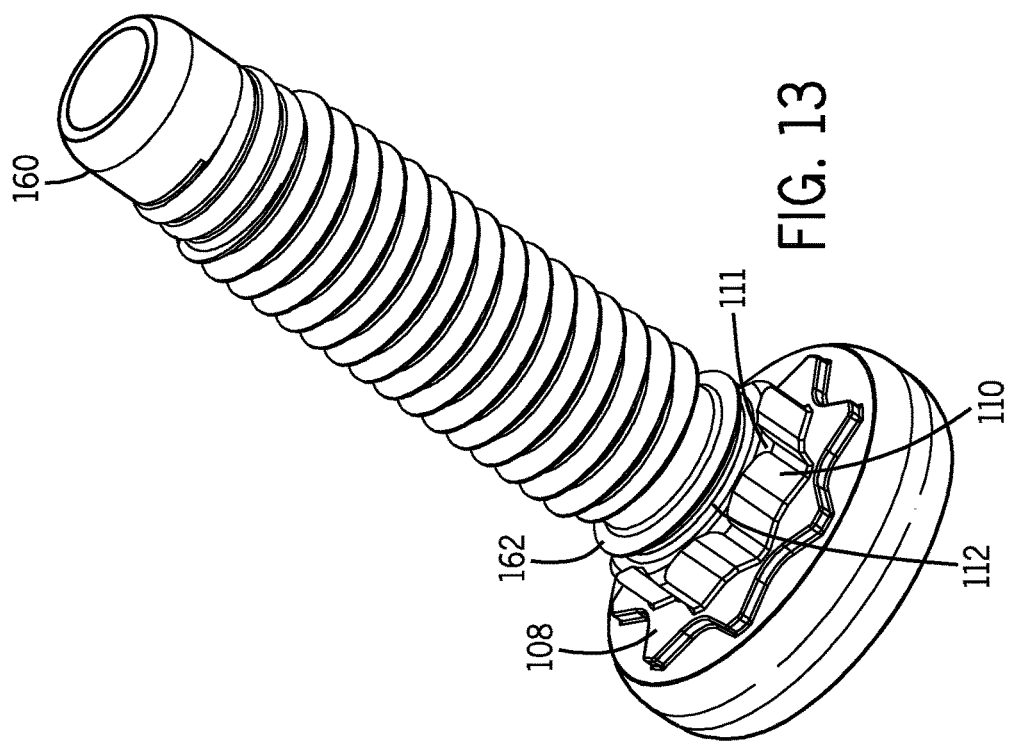
FIG. 13 is a perspective view of another embodiment of a self-clinching fastener in accordance with the invention.
Figure 15:
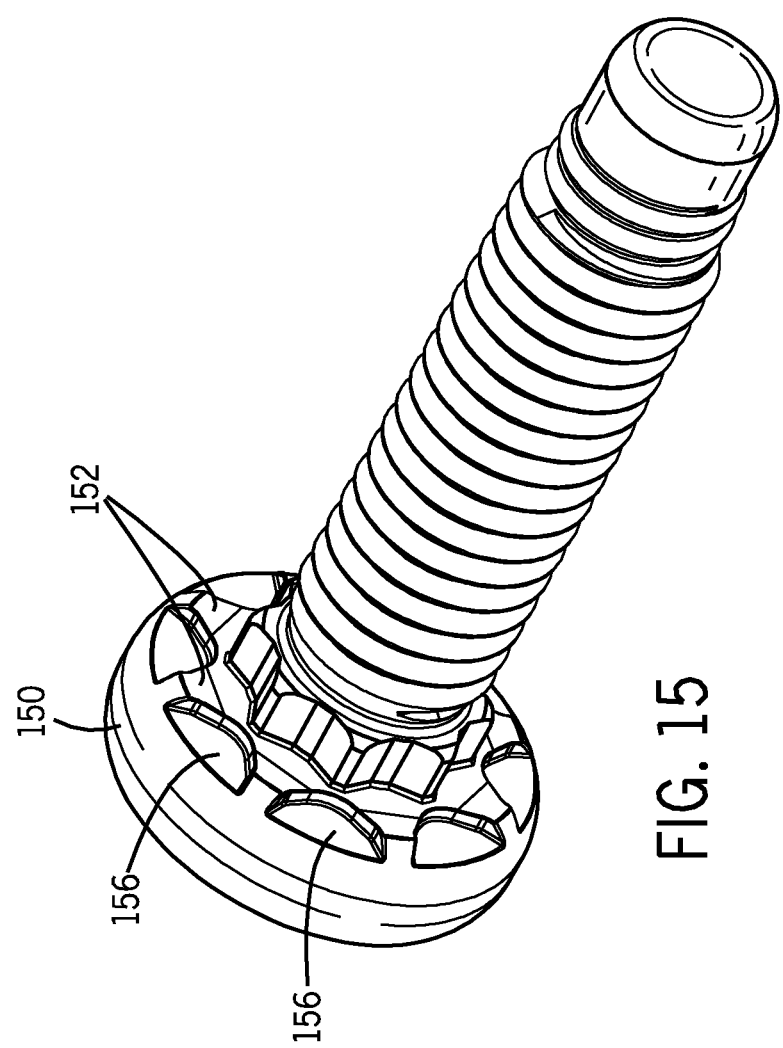
FIG. 15 is a perspective view of another embodiment of a self-clinching fastener in accordance with the invention.
Figure 18:
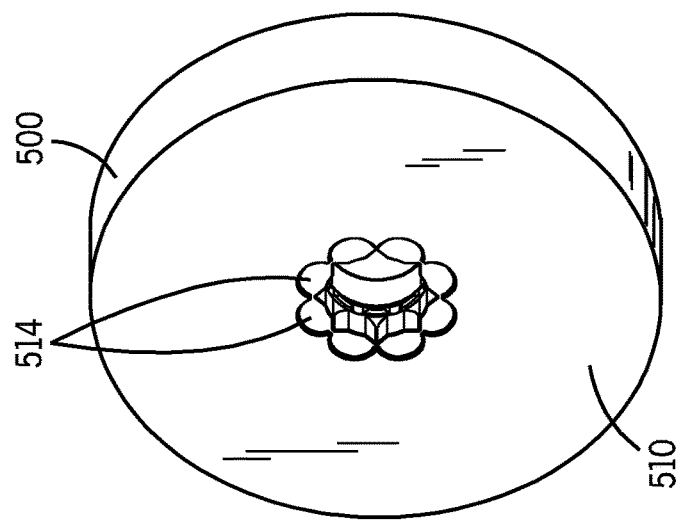
FIGS. 16-18 are perspective views of a thick ductile sheet showing the effect of the self-clinching fastener of FIG. 1 on the sheet as it is inserted into the sheet.
Figure 17:
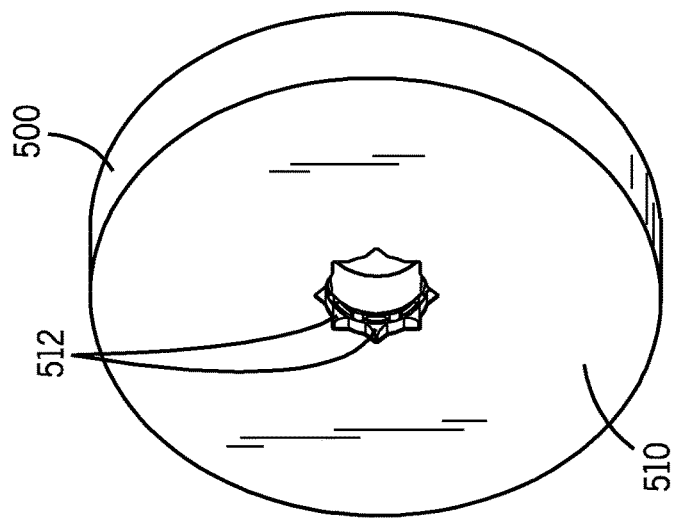

Turning now to FIGS. 2-4, the self-clinching fastener 100 is shown in greater detail. In the embodiment shown, the self-clinching fastener 100 includes a head portion 102, a threaded portion 104 having a smaller outer diameter than the head portion and extending from the sheet-side face 106 of the head portion. Of course, self-clinching fasteners may include different fastening means extending from the head portion without departing from the invention. For example, self-clinching fasteners in accordance with the present invention may also include but are not limited to spacers, standoffs, floating nuts, threaded access hardware, locking fasteners, non-threaded fasteners, concealed head, blind, or sheet joining fasteners. A plurality of radial projections 108 are formed onto the sheet-side face 106. In the embodiment shown, the radial projections 108 are semi-circular, but other shapes may be used without departing from the invention. FIGS. 13 and 15 show representative examples of alternative shapes.

Adjacent to and extending from the sheet-side face 106 is an anti-rotation protrusion 103 that includes a plurality of spline teeth 110 extending radially from the central axis of the self-clinching fastener 100 and a recess 112 with a diameter less than the outer diameter of the threaded portion 104. In the embodiment shown, the plurality of spline teeth 110 extend away from the sheet-side face 106 a majority of the thickness of the nominal metal sheet 200, but extend less than the total thickness of the metal sheet. Each tooth 110 includes a shoulder 111 that helps push clinched material 212 (see FIGS. 6-8) into the recess 112.

The recess 112 provides an area into which clinch material 212 (See FIGS. 6-8) from the nominal metal sheet 200 flows when the self clinching fastener 100 is pressed into the metal sheet. The clinch material 212 that flows into the recess 112 is captured, thereby clinching the self-clinching fastener 100 to the nominal metal sheet 200. In the self-clinching fastener 160 shown in FIGS. 13-14, an annular ring 162 is included, which provides a continuous surface for the clinch material 212 to flow against, thereby containing it in the recess 112. Although not required, including an annular ring 162 increases push-out resistance over self-clinching fasteners that rely on the threads to contain the flow of the clinch material 212 in the recess 112.

In the embodiment shown in FIGS. 1-14, there are eight spline teeth 110 and eight radial projections 108, but more of less of each may be used without departing from the invention. Additionally, the orientation of the plurality of spline teeth 110 and plurality of radial projections is offset in the embodiment shown, but other orientations may be used without departing from the invention. The plurality of radial projections 108 and spline teeth 110 provide torque-out resistance so that when the self-clinching fastener 100 is attached to the nominal metal sheet 200 it does not rotate in the hole. The plurality of spline teeth 110 also pushes clinch material 212 into the recess 112 as the self clinching fastener 100 is pressed into the nominal metal sheet 200.

Turning now to FIGS. 5-12, the insertion of the self-clinching fastener 100 into the nominal metal sheet 200 is shown. FIG. 5 shows the self-clinching fastener 100 just prior to insertion into the nominal metal sheet 200. A punch 300 and die 400 are used to press the self-clinching fastener 100 into the nominal metal sheet 200. FIG. 4 shows the self-clinching fastener 100 partially inserted into the nominal metal sheet 200. During insertion, the plurality of spline teeth 110 displaces clinch material 212 from area surrounding the hole 210 causing the clinch material to flow into the recess 112 of the self-clinching fastener 100. The plurality of spline teeth 110 only displace clinch material 212 in their path, thereby creating corresponding pockets in the metal sheet which further secure the self-clinching fastener 100 and increase the torque-out resistance of the self-clinching fastener. Including spline teeth 112 rather than knurls allows deeper pockets to be formed into the nominal metal sheet 200.

FIGS. 7-12 show the self-clinching fastener 100 fully installed in the nominal metal sheet 200. The clinch material 212 displaced by the insertion of the self-clinching fastener 100 takes a shape defined by the die 400 and features of the self-clinching fastener 100 including, but not limited to the recess 112 and the plurality of spline teeth 110. In the embodiment shown, the clinch material 212 is not displaced as a continuous piece, but has gaps or seams 213 depending on a number of factors including, but not limited to the diameter of the hole 210, the thickness of the nominal metal sheet 200, and the diameter of the die 400. The die 400 may also have a small chamfer or lead-in radius but generally, the die has an inner diameter slightly larger than the major diameter of the threaded portion 104. Using a die 400 with a slightly larger diameter than the major diameter of the threaded portion 104 minimizes the size of the clinch material 212. The clinch material 212 clinches the self-clinching fastener 100 to the nominal metal sheet 200 and resists push-out while also providing a confined and undistorted region around the clinched surface. Unlike prior art self-clinching fasteners that have significant protrusions or recesses in the clinch area that interfere with sealing or being able to attach a nut to the exposed surface of the nominal metal sheet 200, the present invention allows for fasteners that leave the punch-side surface 220 of the metal sheet undisturbed. This is especially useful in instances where gaskets or other seals are attached to the nominal metal sheet 200 by the self-clinching fastener because a more complete and effective seal can be created.

The plurality of spline teeth 110 and the plurality of radial projections 108 both independently and together provide resistance to rotation. The plurality of spline teeth 110 engage the inner diameter of the hole 210 and the thickness of the nominal metal sheet 200. The plurality of radial projections 108 are embedded into the nominal metal sheet 200 when the self-clinching fastener 100 is clinched to the sheet. Although the embodiment shown includes both spline teeth 110 and radial projections 108 on the same fastener, the spline teeth 110 greatly improve torque-out and push out resistance independent of the radial projections 108, and a fastener including only the spline teeth 110 and lacking the radial projections 108 does not depart from the invention.

Figure 14:
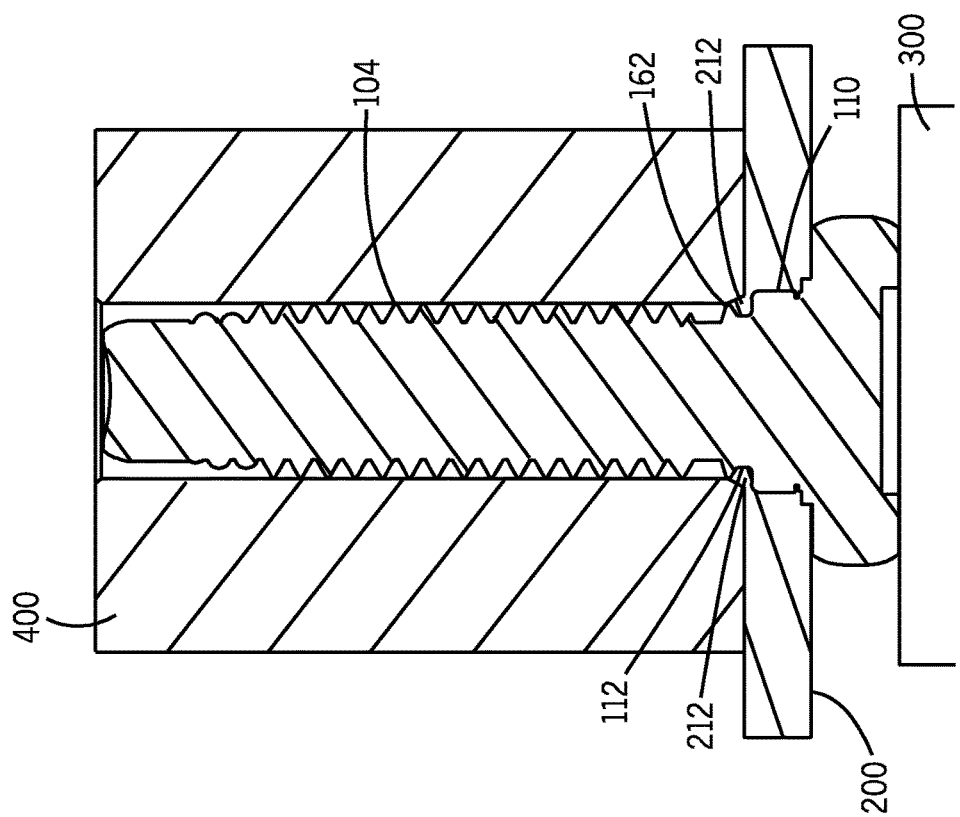
FIG. 14 is a section view of the self-clinching fastener of FIG. 13 shown clinched to a ductile sheet with the punch and die.
Figure 16:
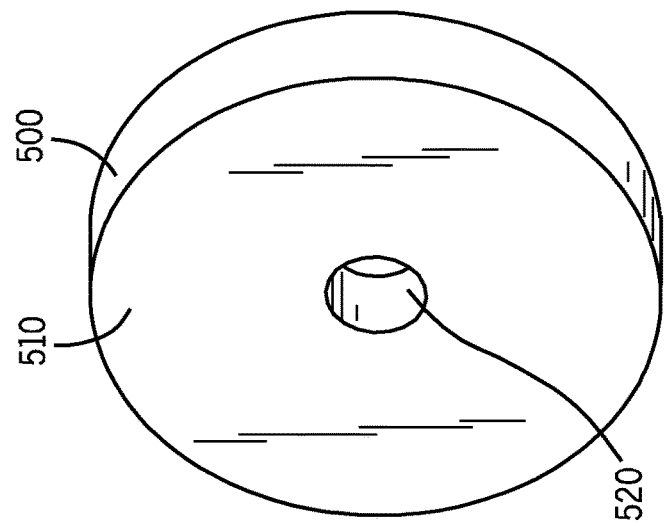
Figure 21:
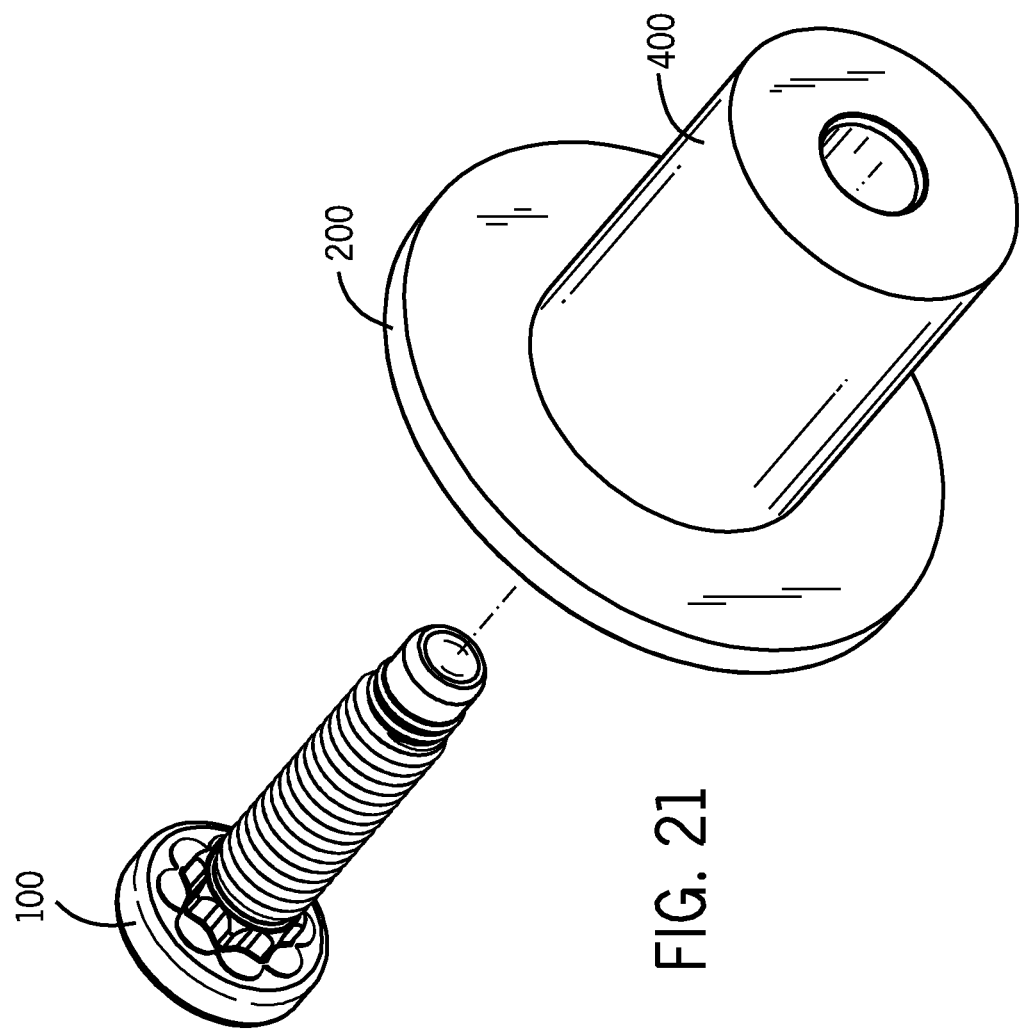
FIG. 21 is an exploded view of the self-clinching fastener, ductile sheet, and die of FIG. 1.

Turning now to FIG. 14-16, the effect of the self-clinching fastener on a ductile sheet 500 is shown. The ductile sheet 500 has a die side 510 and a punch side (not shown). FIG. 14 shows a pre-punched or drilled hole 520 in the ductile sheet 500. FIG. 15 shows the ductile sheet 500 after partial insertion of the self-clinching fastener 100 (not shown). As previously discussed, the plurality of spline teeth 110 pushes clinch material 512 in the direction of insertion of the self-clinching fastener 100. As the clinch material 512 is pushed, it cold flows inward, reducing the diameter of the hole 510, and filling the recess 112, thereby clinching the fastener to the ductile sheet 500. Of course, as the self-clinching fastener 100 is inserted farther into the ductile sheet 500, the plurality of spline teeth 110 pushes more clinch material 512 into the recess 112. FIG. 16 shows the profile of the hole 510 after the self-clinching fastener 100 has been fully seated into the ductile sheet 500. When the plurality of radial projections 108 are pressed into the surface of the ductile sheet 500, it forms anti-rotation lobes 514 into the ductile sheet.

Alternatively, the self-clinching fastener 300 may be secured to metal sheets of greater or lesser thickness than the nominal metal sheet 200 shown in FIGS. 5-12. FIGS. 5-12 and 17-23 show the effect of inserting the self-clinching fastener 100 into metal sheets of varying thickness. For purposes of the following, metal sheets are categorized into three categories based on the ratio of sheet thickness to the length of the plurality of spline teeth 110: (1) a thick metal sheet 600 has a thickness greater than the axial length of the plurality of spline teeth 110 (see FIG. 23), (2) the nominal metal sheet 200 has a thickness approximately the same as the axial length of the plurality of spline teeth 110 (see FIGS. 5-12), and (3) a thin metal sheet 700 has a thickness less than the axial length of the plurality of spline teeth 110 (see FIGS. 17-21).

FIG. 23 shows the insertion of the self-clinching fastener 100 into a thick metal sheet 600. Clinching the self-clinching fastener 100 to the thick metal sheet 600 causes shoulders 111 on the plurality of spline teeth 110 to force clinch material 612 into the recess 112. A die (not shown) supports the metal sheet, but the hole 610 confines the clinch material 612 such that it is forced into the recess 112. If the thick metal sheet 600 is sufficiently rigid, it would be possible to clinch the self-clinching fastener 100 to the thick metal sheet 600 without using a die.

FIGS. 5-12 shows the insertion of the self-clinching fastener 100 to a nominal metal sheet 200. Clinching the self-clinching fastener 100 to a nominal metal sheet 200 causes the shoulders 111 to push clinch material 212 into the recess 112. As shown in FIGS. 7 and 8, the die 400 helps guide the clinch material 212 into the recess.

FIGS. 17-21 show the insertion of the self-clinching fastener 100 to a thin metal sheet 700. The thin metal sheet has a die side 720 and a punch side 730. Clinching the self-clinching fastener 100 to a thin metal sheet 700 causes the die 400 to confine the clinch material 712 pushed by the plurality of spline teeth 110 between the die and the self-clinching fastener. Additionally, the die 400 peens or flares the ends 116 of the plurality of spline teeth 110 back against the die side 720 of the thin metal sheet 700. In the embodiment shown, the plurality of spline teeth 110 are offset from the radial projections 108, which causes the thin metal sheet 700 to be clinched into a wave pattern, which increases both push-out and torque-out resistance. Of course, the plurality of spline teeth 110 and radial projections 108 may have alternate orientations to each other without departing from the invention.

Figure 24:
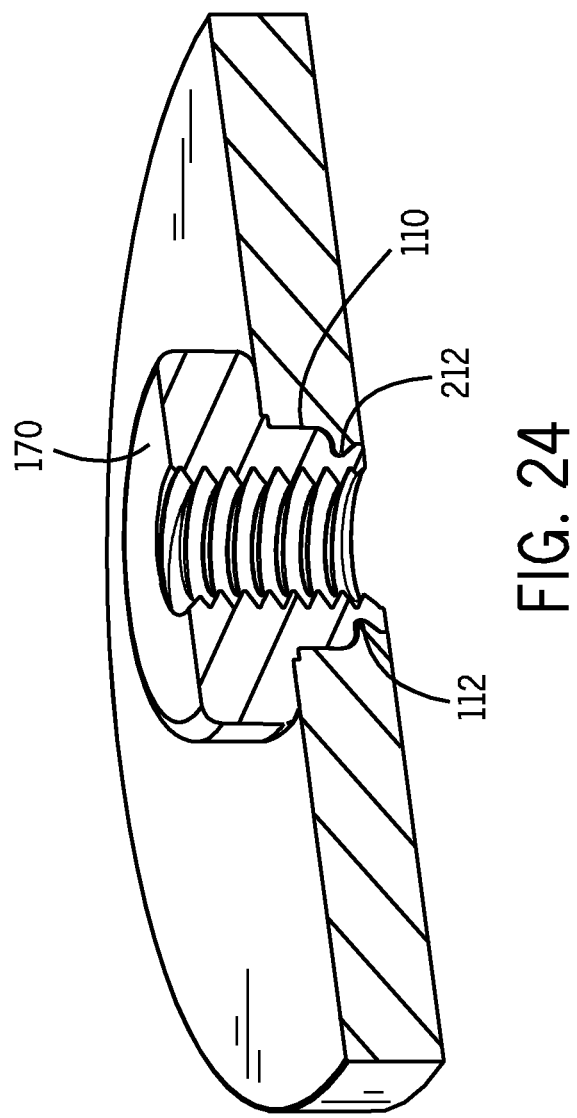
FIG. 24 is a section view of another embodiment of a self-clinching fastener in accordance with the invention shown clinched to a ductile sheet and shown in section.
Figure 25:
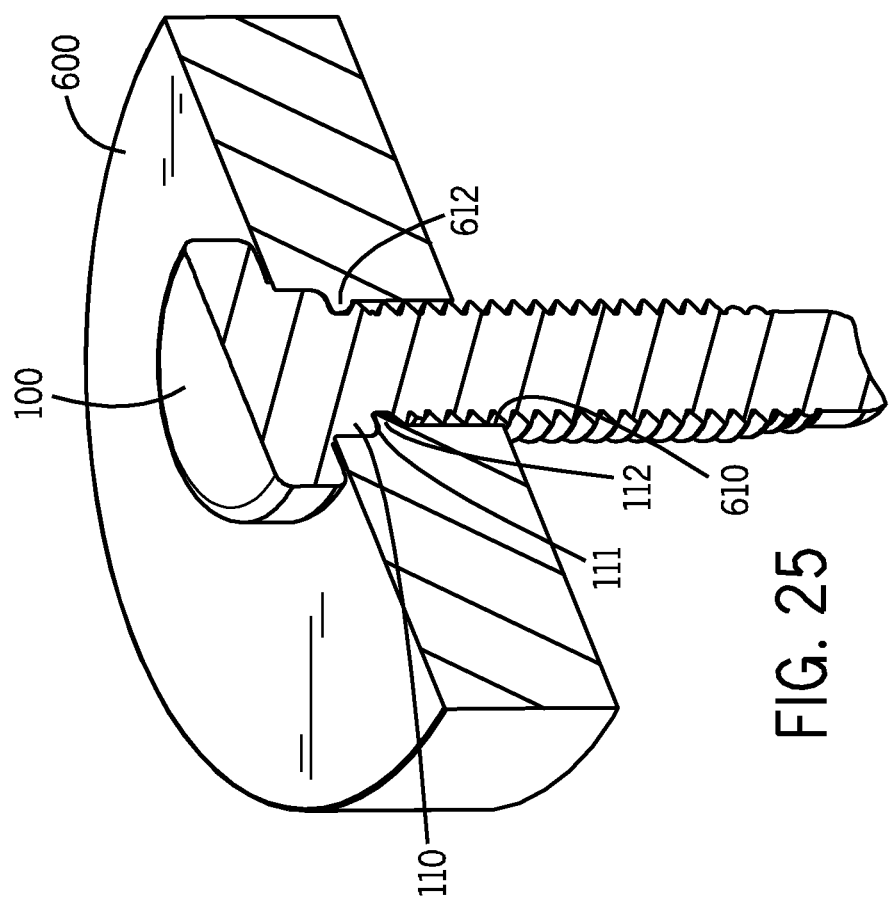
FIG. 25 is a section view of the self clinching fastener of FIG. 1 shown clinched to a ductile sheet also shown in section.

Turning now to FIGS. 13 and 22, alternative embodiments of self-clinching fasteners are shown. FIG. 13 shows a threaded stud 150 with radial projections 152 in an alternative configuration. Of course, the profile of the plurality of spline teeth 154 and the radial projections 152 may vary without departing from the invention. Here, the radial projections 152 have profiles similar to the plurality of spline teeth 154, with pockets 156 between the radial projections for material displaced by the radial projections to flow into. FIG. 24 shows a self-clinching nut 170 with the same clinching features as self-clinching fastener 100.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:
1. A self-clinching fastener for connection to a hole in ductile material and including a central axis, the self-clinching fastener comprising:
a head including an inner surface and an outer surface;

an anti-rotation protrusion adjacent to and projecting from the inner surface of the head and including a plurality of teeth extending radially from the central axis;

a clinched material recess adjacent to the anti-rotation protrusion; and each of the plurality of teeth having shoulder portions that cause the ductile material to flow into the clinched material recess when the self-clinching fastener is pressed into the ductile material.

2. The self-clinching fastener of claim 1, wherein the self-clinching fastener is pressed into the hole in the ductile material with a punch and die.

3. The self-clinching fastener of claim 1, wherein the plurality of teeth are offset from a plurality of projections extending radially from the inner surface around the central axis.

4. The self-clinching fastener of claim 1, further including an annular portion adjacent to the clinched material recess.

5. The self-clinching fastener of claim 4, further including a threaded portion adjacent to and projecting from the annular portion.

6. The self-clinching fastener of claim 1, further including a threaded portion adjacent to and projecting from the clinched material recess.

7. The self-clinching fastener of claim 1, wherein the self-clinching fastener is a nut.

8. The self-clinching fastener of claim 1, wherein the self-clinching fastener is a Standoff.

9. The self-clinching fastener of claim 1, wherein the self-clinching fastener is a non-threaded fastener.

10. The self-clinching fastener of claim 1, wherein the self-clinching fastener is a blind fastener.

* * * * *